(12) United States Patent
Pesonen et al.

(10) Patent No.: US 8,672,229 B2
(45) Date of Patent: Mar. 18, 2014

(54) ELECTRONIC MODULE HOLDER WITH SLIDING DOOR

(75) Inventors: Mikko Juhani Pesonen, Tampere (FI); Ville Henrikki Vehkapera, Cupertino, CA (US); Jani Latvakoski, Kiiminki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 13/423,621

(22) Filed: Mar. 19, 2012

(65) Prior Publication Data

US 2013/0240629 A1    Sep. 19, 2013

(51) Int. Cl.
*G06K 7/00*            (2006.01)
(52) U.S. Cl.
USPC .......................................... 235/486; 235/492
(58) Field of Classification Search
USPC ............ 235/486, 492; 361/752, 754; 439/630
See application file for complete search history.

(56) References Cited

U.S. PATENT DOCUMENTS

| | | | | |
|---|---|---|---|---|
| 6,035,216 A | * | 3/2000 | Cheng et al. | 455/558 |
| 6,450,408 B2 | * | 9/2002 | Shiue | 235/492 |
| 6,601,766 B2 | * | 8/2003 | Nakagawa et al. | 235/451 |
| 6,766,952 B2 | * | 7/2004 | Luu | 235/451 |
| 8,150,466 B2 | * | 4/2012 | Park et al. | 455/558 |
| 2003/0069040 A1 | * | 4/2003 | Chuang et al. | 455/558 |
| 2006/0154136 A1 | * | 7/2006 | Ge et al. | 429/97 |

* cited by examiner

*Primary Examiner* — Ahshik Kim
(74) *Attorney, Agent, or Firm* — Harrington & Smith

(57) ABSTRACT

An assembly including an electronic module holder configured to hold an electronic module, where the holder is configured to be inserted into a mating receiving area of an apparatus; and a door slideably connected to the electronic module holder. The door is configured to close an entrance into the receiving area of the apparatus. The door is slideable relative to the holder to latch and unlatch the assembly with the apparatus.

26 Claims, 11 Drawing Sheets

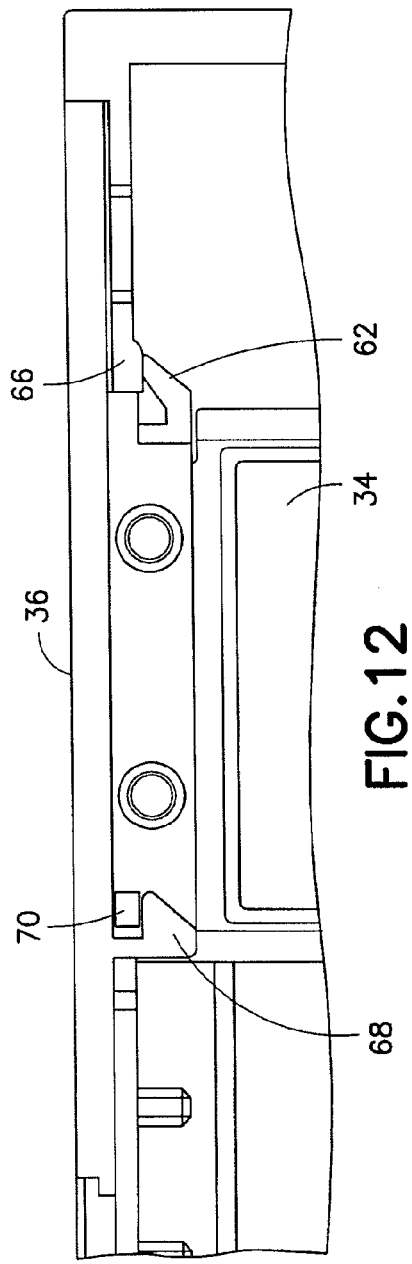
FIG. 12
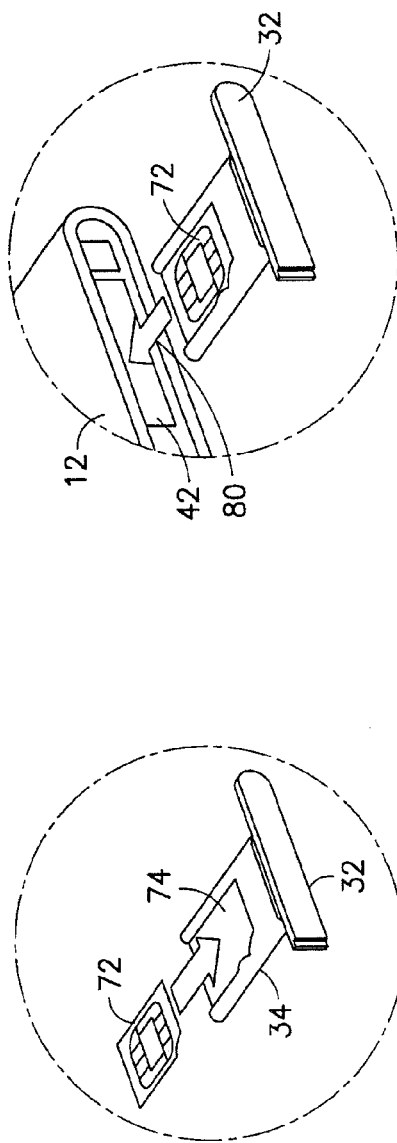
FIG. 13
FIG. 14

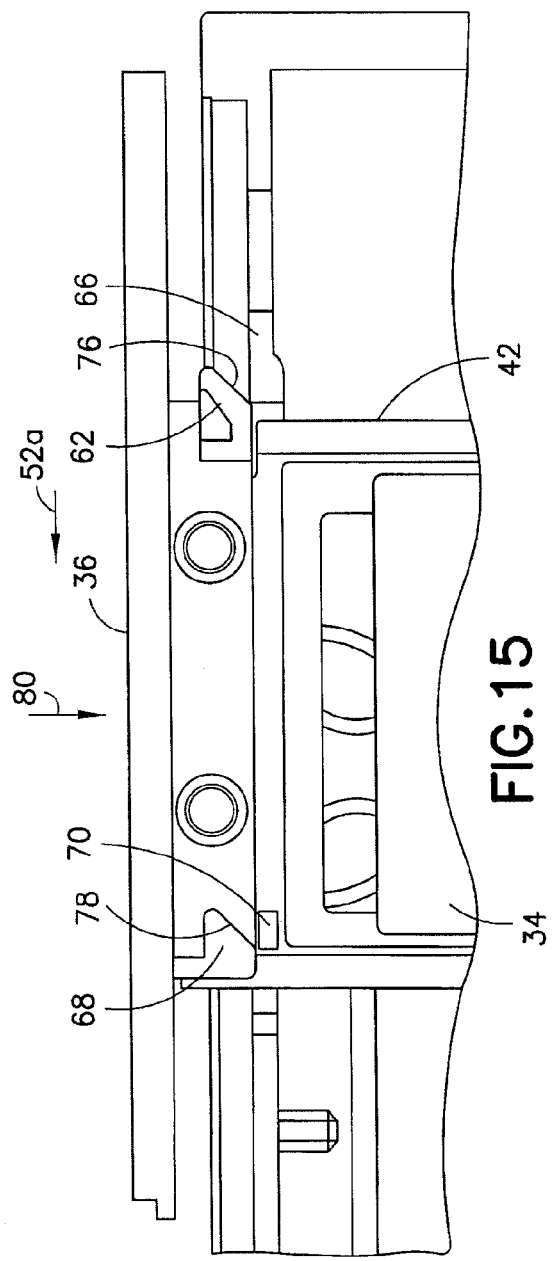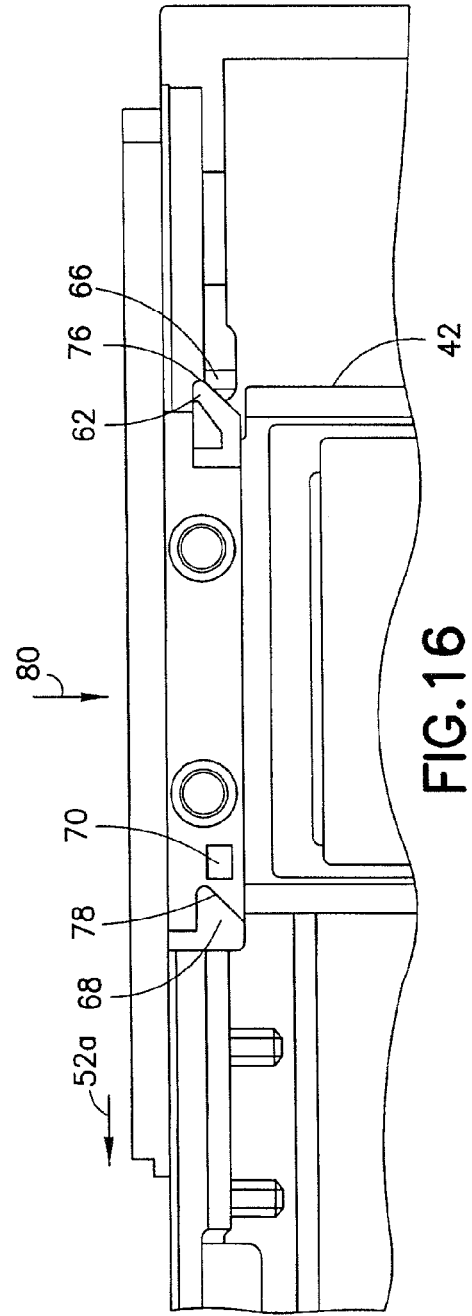

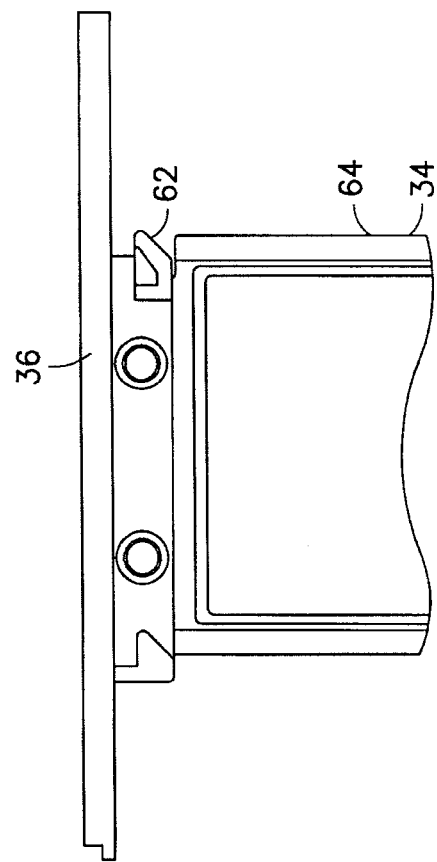
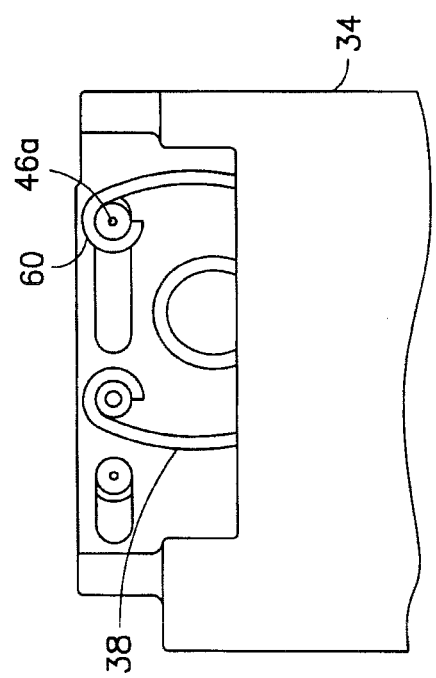

ELECTRONIC MODULE HOLDER WITH SLIDING DOOR

BACKGROUND

1. Technical Field

The exemplary and non-limiting embodiments relate generally to an electronic module and, more particularly, to an electronic module holder having a slideable door.

2. Brief Description of Prior Developments

A subscriber identity module or subscriber identification module (SIM) card reader in a device such as a mobile phone for example, may be housed under a battery or behind a battery cover. In some devices the SIM card reader is housed along an edge of a handset. In some arrangements a hinged door may reveal the SIM card which may be ejected from the reader. The IPHONE has an eject mechanism whereby the user can place a paper clip in an aperture in the door of the reader and the tray, and door is ejected from the handset housing. With a hinged door the aesthetic look of the device may be compromised by the hinge, and in the case of the IPHONE a paper clip is needed for ejection.

SUMMARY

The following summary is merely intended to be exemplary. The summary is not intended to limit the scope of the claims.

In accordance with one aspect, an assembly is provided including an electronic module holder configured to hold an electronic module, where the holder is configured to be inserted into a mating receiving area of an apparatus; and a door slideably connected to the electronic module holder. The door is configured to close an entrance into the receiving area of the apparatus. The door is slideable relative to the holder to latch and unlatch the assembly with the apparatus.

In accordance with another aspect, a method comprises providing a SIM card on a SIM card holding tray of an assembly; and sliding the tray into a mating receiving area of an apparatus, where a door of the assembly is moved into an entrance of the receiving area to close the entrance, and where the door slides relative to the tray to latch the door to the apparatus.

In accordance with another aspect, a method comprises providing a SIM card holding tray configured to hold a SIM card, where the tray is configured to slide with the SIM card into a receiving area of an apparatus through an entrance; and slideably connecting a door to the tray, where the door is configured to close the entrance and slide relative to the tray between a latched position and an unlatched position at the entrance.

BRIEF DESCRIPTION OF THE DRAWINGS

The foregoing aspects and other features are explained in the following description, taken in connection with the accompanying drawings, wherein:

FIG. 12 is an enlarged partial sectional view showing the assembly at the position shown in FIGS. 10-11 and with the door in a latched position with the apparatus corresponding to FIG. 6;

FIG. 13 is a perspective view illustrating how a SIM card is inserted into the assembly;

FIG. 14 is a perspective view illustrating how the assembly with attached SIM cart are inserted into a receiving area of the apparatus;

FIG. 15 is an enlarged partial sectional view showing the assembly at the position shown in FIGS. 10-11 before the door latches with the housing;

FIG. 16 is a view as in FIG. 15 at an intermediate position during latching of the door with the housing;

FIG. 17 is a view similar to FIG. 10 showing the deflection of the spring corresponding to the position shown in FIG. 16;

FIG. 18 is a view similar to FIG. 11 shown the position of the door corresponding to the positions shown in FIG. 17;

DETAILED DESCRIPTION OF EMBODIMENTS

Figure 1:
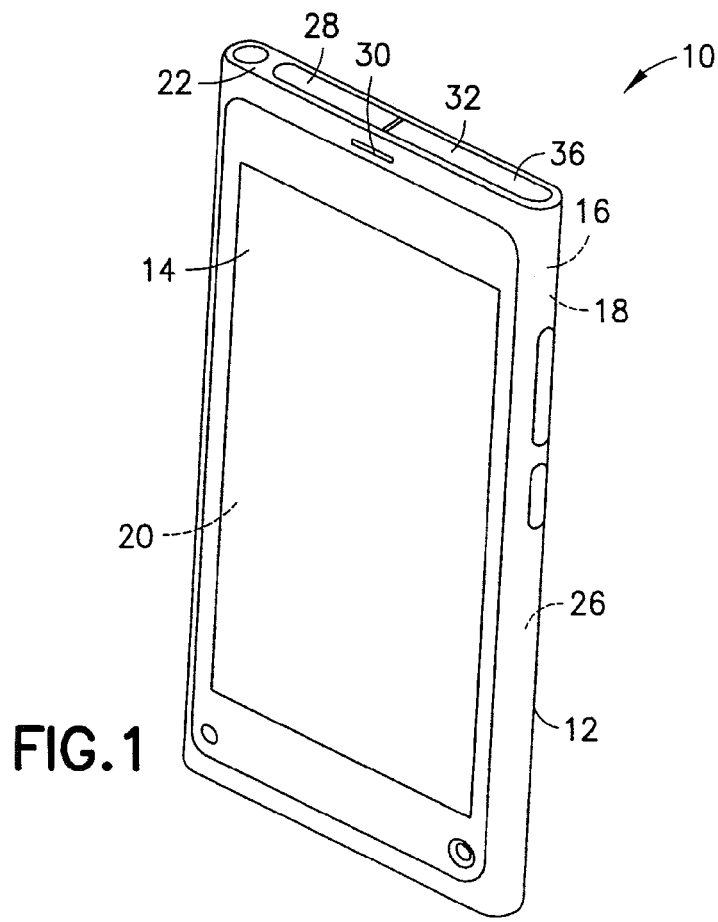
FIG. 1 is a perspective view of an apparatus.

Referring to FIG. 1, there is shown a perspective view of an apparatus 10 incorporating features of an example embodiment. Although the features will be described with reference to the example embodiment shown in the drawings, it should be understood that features can be embodied in many alternate forms of embodiments. In addition, any suitable size, shape or type of elements or materials could be used.

The apparatus 10, in this example, is a hand-held communications device which includes a telephone application. The apparatus 10 can also comprise other applications such as, for example, an Internet browser application, camera application, video recorder application, music player and recorder application, email application, navigation application, gaming application, and/or any other suitable electronic device application. The apparatus 10, in this example embodiment, comprises a housing 12, a display 14 (such as a touch screen for example), a receiver 16, a transmitter 18, a rechargeable battery 26, and a controller 20 which can include at least one processor, at least one memory, and software. However, all of these features are not necessary to implement the features described below. In an alternate example embodiment, the apparatus does not need to be a phone and could be any suitable type of electronic apparatus such as a camera or video recorder for example.

Figure 2:
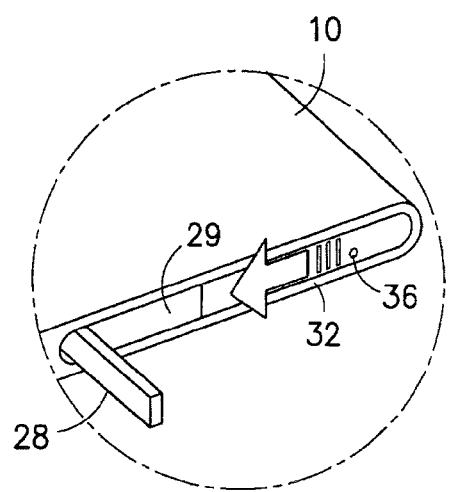
FIG. 2 is an enlarged partial view of a portion of the apparatus shown in FIG. 1 with a door/cover moved.
Figure 3:
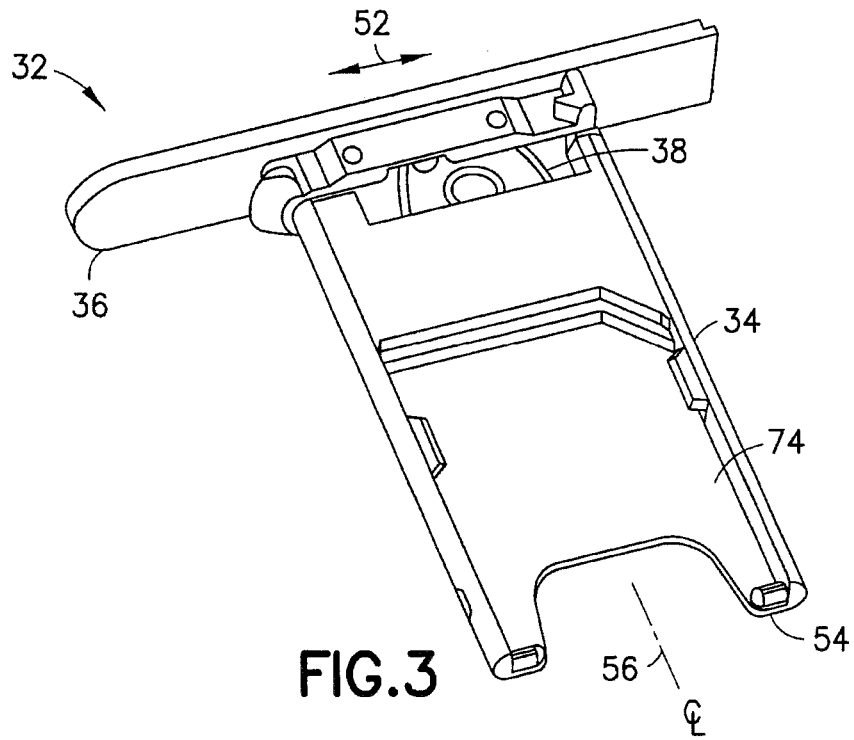
FIG. 3 is a perspective view of an assembly used in the apparatus shown in FIGS. 1 and 2.
Figure 4:
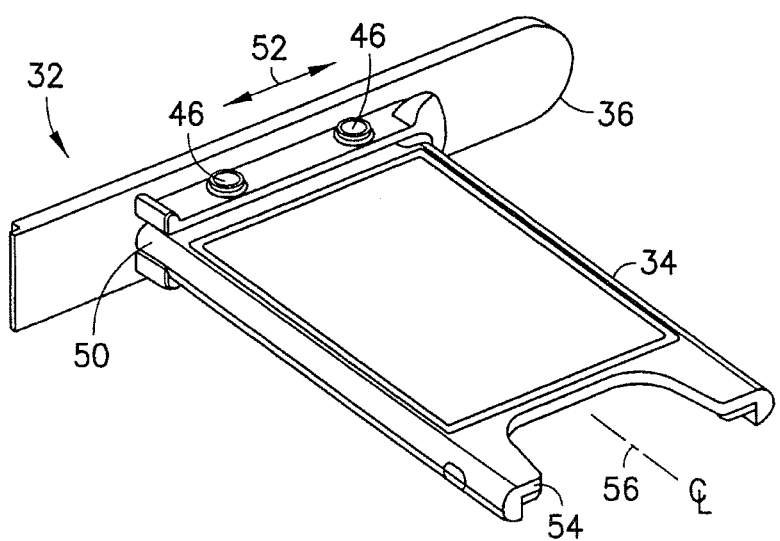
FIG. 4 is a perspective view of the assembly shown in FIG. 3 from another direction.
Figure 5:
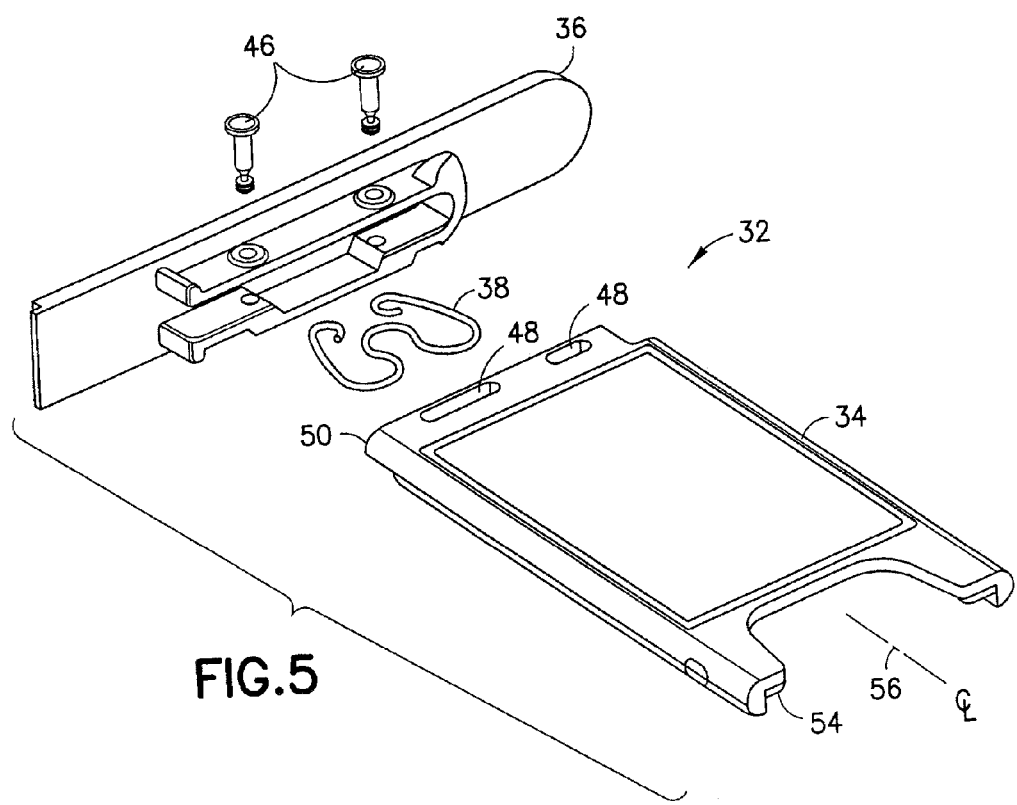
FIG. 5 is an exploded perspective view of the assembly shown in FIG. 4.

Referring also to FIG. 2, in this example an end 22 of the housing 12 proximate the earpiece/speaker 30 comprises a door 28 covering a micro-USB connector, and an assembly 32. Referring also to FIGS. 3-5, the assembly generally comprises an electronic module holder 34, a door 36 and a spring 38. In this example the door 28 needs to be moved in order to move the door 36 from a home position. In other words, when the door 28 is in its closed position shown in FIG. 1, the door 28 blocks movement of the door 36 from its latched position shown in FIG. 1. The USB cover 28 and the SIM door 36 arrangement in this example has a USB door side-by-side with the SIM door. Thus, in the example shown, the grove 29 (see FIG. 2) which normally receives the cover 28, is used for both the cover 28 and part of the door 36 to slide into. In an alternate example embodiment rather than using the groove 29 for both purposes, one might provide a separate cap/groove/fox hole for the lateral SIM door movement. However, in an alternate example the door 28 might not need to be moved to remove the assembly 32. In addition, in an alternate example the assembly 32 could be located in any other suitable location on the apparatus 10.

Figure 6:
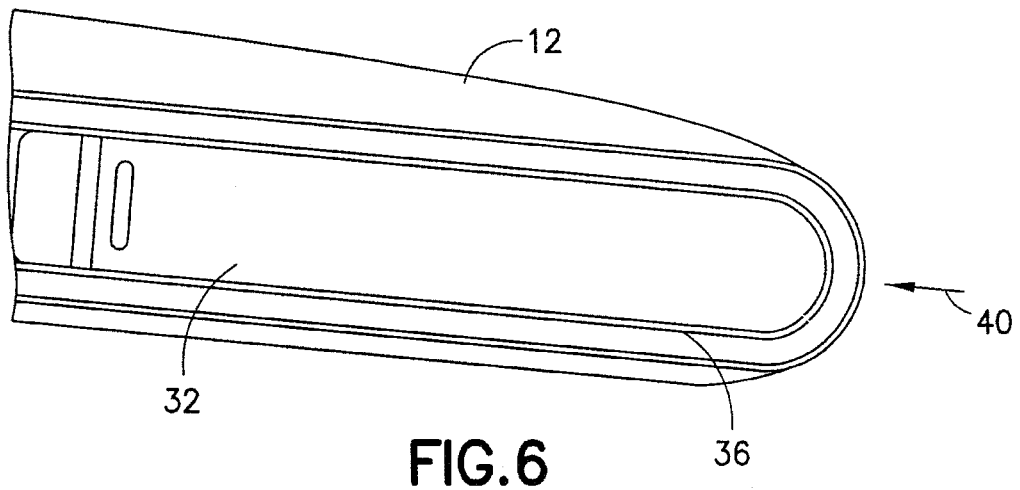
FIG. 6 is an enlarged perspective view of the assembly shown in FIGS. 3-4 at the end of the apparatus in a latched position.
Figure 7:
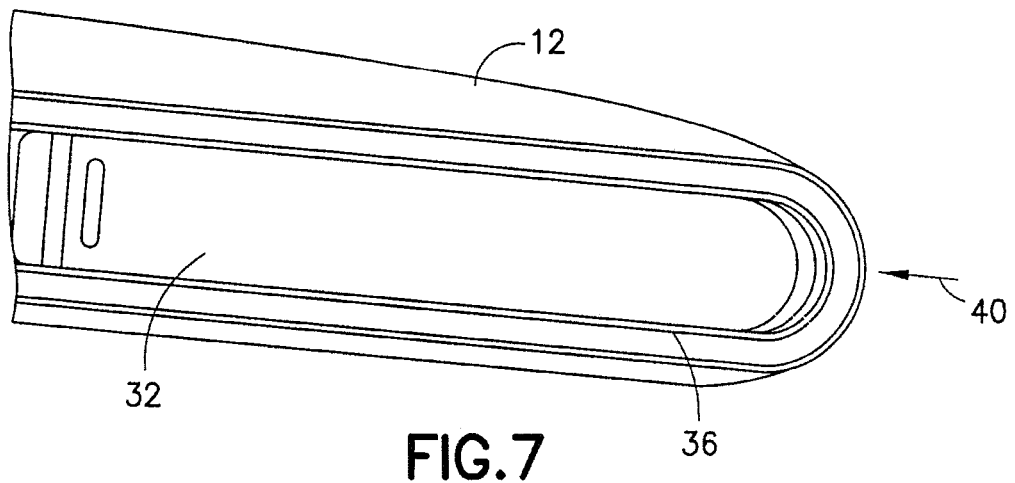
FIG. 7 is a view as in FIG. 6 with the door of the assembly moved to an unlatched position.
Figure 8:
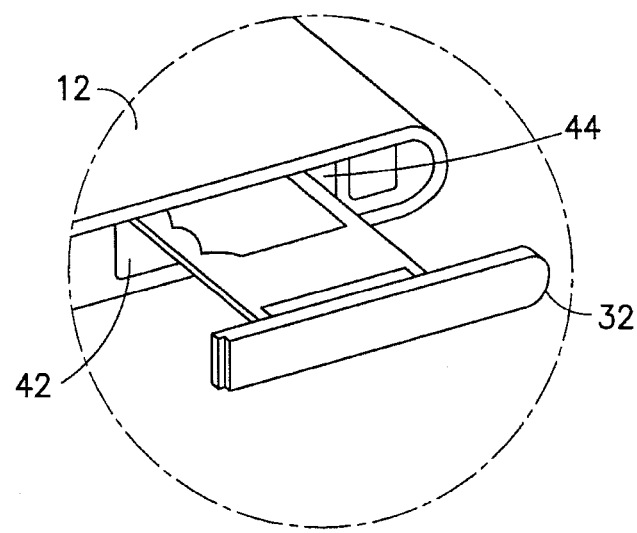
FIG. 8 is a partial perspective view of the assembly shown in FIGS. 3-4 being removed from the apparatus.

Referring also to FIGS. 6-7, FIG. 6 shows the assembly 32 in its latched position on the housing 12. In this position the holder 34 is matingly received in a receiving area (slot) 42 (see FIG. 8) through the housing into the card reader of the apparatus. The door 36 is latched with the housing 12 proximate the entrance 44 to the slot 42. FIG. 7 shows the door 36 of the assembly 32 moved to an unlatched position. In particular, the door 36 is slid as indicated by arrow 40 from the latched position shown in FIG. 6 to the unlatched position shown in FIG. 7. In this unlatched position the holder 34 has not been moved and is still matingly located in the receiving area (slot) to the card reader of the apparatus, but the door 36 is unlatched with the housing 12. With the door 36 unlatched, the assembly 32 may be removed from the rest of the apparatus as indicated in FIG. 8.

Figure 9:
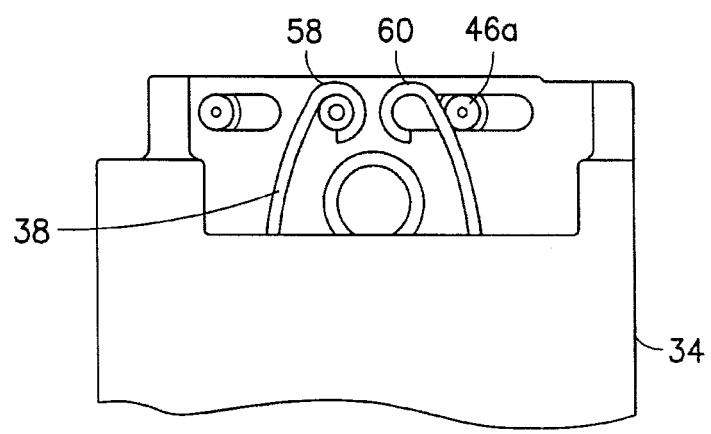
FIG. 9 is a partial view showing ends of the spring shown in FIG. 5 before final connection to the pin of the door.

Referring back to FIG. 5, in this example embodiment the door 36 is slideably connected to the holder 34 by two pins 46. The pins 46 are located in elongate slots 48 in the rear end 50 of the holder 34. Thus, the door 36 is slideable on the rear end 50 of the holder 34 in direction 52 (see FIGS. 3 and 4) which is generally orthogonal to the longitudinal axis 56 of the holder 34 between its rear end 50 and front end 54. Referring also to FIG. 9, a first end 58 of the spring 38 is connected to the holder 34. As illustrated best in FIG. 10, a second end 60 of the spring 38 is connected to one of the pins 46a. The spring 38 is shown in FIG. 9 before its second end 60 is connected to the pin 46a. Thus, when the second end 60 is connected to the pin 46a, the spring 38 is deformed and exerts a biasing force on the pin 46a to bias the door 36 in the latch position shown in FIG. 11.

Figure 11:
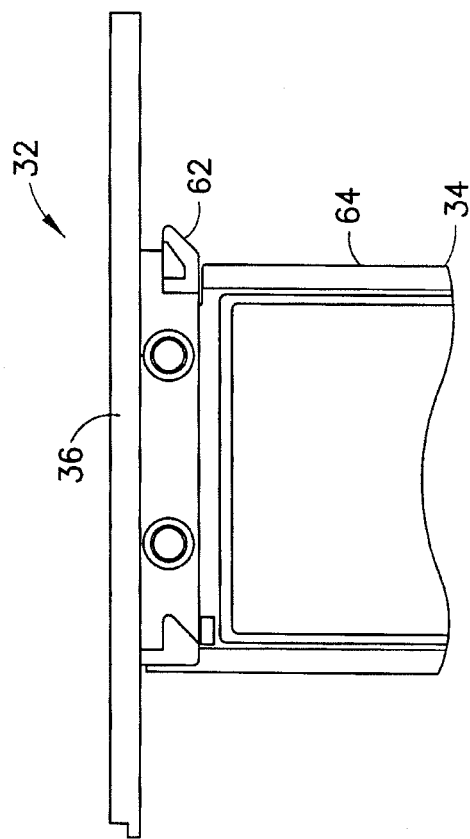
FIG. 11 is a partial bottom view of the assembly corresponding to the position shown in FIG. 10.
Figure 10:
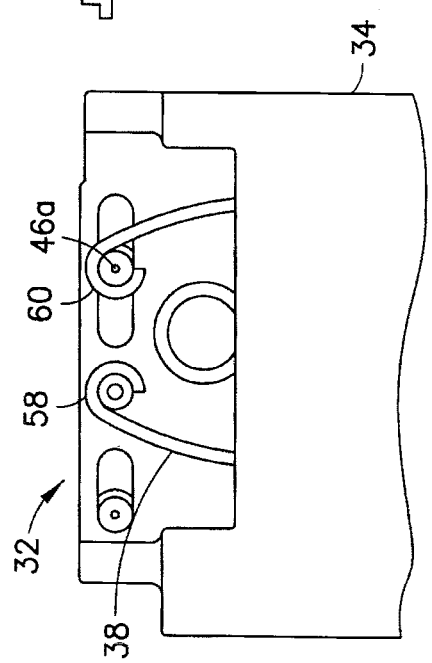
FIG. 10 is a view as in FIG. 9 showing the spring connected to the pin of the door.

In the latch position shown in FIG. 11 the latch 62 of the door 36 extends past the lateral side 64 of the holder 34. FIGS. 10 and 11 shown the assembly 32 in the same position as they are in when connected to the housing illustrated in the latched position shown in FIG. 6. Referring also to FIG. 12, in this latched position, the latch 62 is latched behind a latch surface 66 of the housing 12. In this example the door 36 has a second latch 68 which is latched behind a second latch surface 70 of the housing 12.

Referring also to FIGS. 13-14, in normal use an electronic module 72, such as a SIM module for example, is inserted into the receiving area 74 of the holder 34. The assembly 32 with the module or card 72 is then connected to the rest of the apparatus as illustrated in FIG. 14. In particular, the holder 34 is matingly inserted into the slot 42 and the door 36 moves towards covering the entrance to the slot 42.

Referring also to FIGS. 15-16, as the door 36 moves towards the entrance as indicated by arrow 80, cam surfaces 76, 78 on the latches 62, 68 contact the latch surfaces 66, 70 which causes the door 36 to be cammed in direction 52a. The spring 38 is able to resiliently deflect from its home position shown in FIG. 10 to the position shown in FIG. 17. As the latches 62, 68 pass the latch surfaces 66, 70, the spring 38 is able to exert a bias force against the door 36, via the pin 46a, to slide the door 36 from its unlatched position shown in FIGS. 7, 16, 18 back to its latch position shown in FIGS. 6, 11 and 12. Thus, the assembly 32 is now latched to the rest of the apparatus 10. The door 36 and spring 38 function as a snap-lock latch for the assembly.

Figure 19:
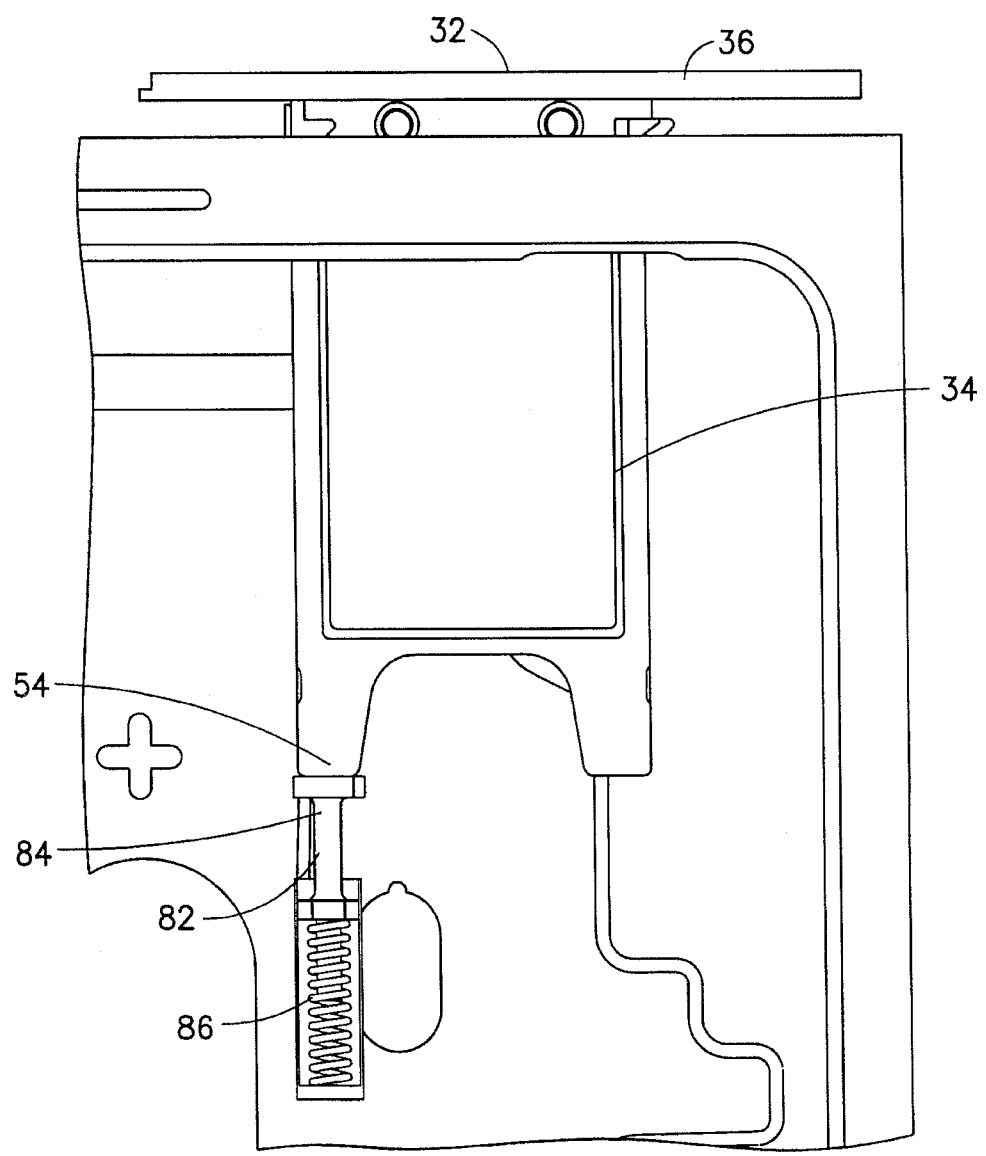
FIG. 19 is a diagram illustrating a ejector of the apparatus.
Figure 20:
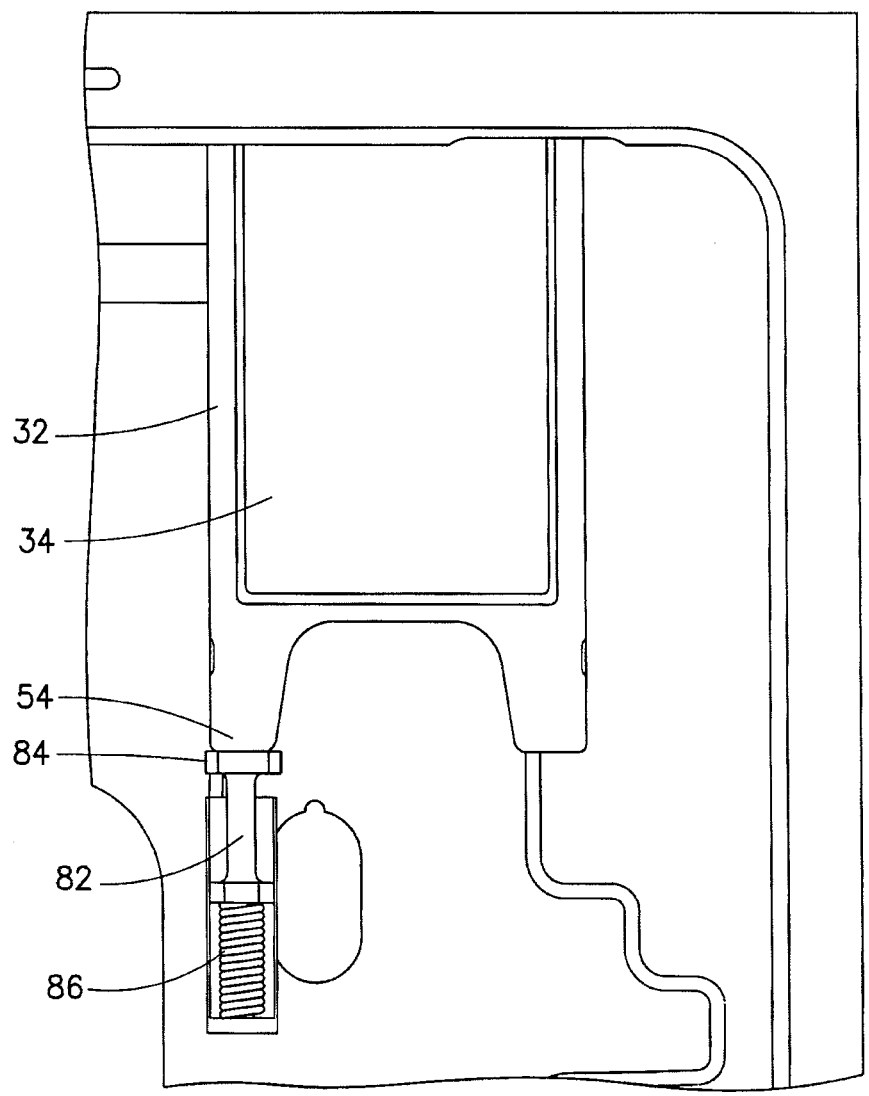
FIG. 20 is a diagram similar to FIG. 19 showing the ejector when the assembly 32 is latched to the apparatus as a home assembled position.

Referring also to FIGS. 19-20, in this example embodiment the apparatus comprises an ejector 82 comprising a plunger 84 and a spring 86. However, in an alternate embodiment the ejector might not be provided, or any other suitable ejection-assist system could be provided. When the assembly 32 is inserted into its receiving slot in the housing 12, the front end 54 of the holder contacts the plunger 84 and pushes the plunger 84 inward. This causes the spring 86 to compress. The latching system provided by the door 36 with the housing 12 allows the spring 86 to remain compressed. When the door 36 is slid to its unlatched position on the housing 12, the ejector 82 can then use the spring 86 to push the assembly 32 at least partially outward so the user can easily grasp the door 36 and remove the entire assembly 32 from the rest of the apparatus 10.

An example embodiment relates to a SIM card holder, in particular the way in which the SIM card tray may be ejected from a handset. The SIM card reader in a device may be housed under a battery or behind the battery cover. In some devices the SIM card reader is housed along an edge of a handset so that a tray (containing the card) can be ejected from the side of the housing.

An advantage of features described herein is that the SIM card tray can be ejected by a slide motion and, therefore, fingernails under the door are not required (such as is necessary in the case of a hinged door) or a special tool, such as a paper clip, is not needed to eject the card from the reader. With features described herein, a SIM card tray is provided, in one example, that can be ejected from the housing of a device by way of slide motion. In one example the SIM tray door cannot be slid until another door, such as the door 28, is opened or moved. The door 36 on the holder may be spring loaded. Door can be slid between a first position and a second position, where the spring pushes the door in a direction towards the first position. The Spring may be loaded between the SIM Door 36 and SIM Tray 34 so that one end 58 is connected to SIM tray and another end 60 is connected to the SIM door via a pin 46a. The pins 46 may be fixed to door 36 rigidly. When door 36 is being slid from the first position to the second position the spring force increases. When the door 36 is being released, the spring returns the door to the first position on the tray. When the assembly 32 is being pushed inside the apparatus 10, the pushing force is being guided through the locking feature shapes to the door assembly, making the door to slide. Movement of the SIM Tray 34 in this lateral direction is being prevented by the housing 12 inside the device. Therefore, the SIM Tray 34 merely moves in the insertion direction 80. When door 36 is being pushed all the way to the end, the spring force in the assembly makes the door locking features to move into the correct postion (behind the counter features 66, 70 in the apparatus 10). The spring 38 in the assembly 32 makes the door move and lock it to housing 12 of the apparatus 10.

In the example described above, there is a spring loaded ejector element inside the apparatus. When the assembly is being inserted into device the spring in ejector element is being compressed. Releasing happens when the door is being slid from outside the device. When the door is being slid, the locking features in the door move away from counter features in the housing. The ejector element makes the assembly pop-out, after the locking features between door and housing are separated.

To open the cover 28 of the micro-USB connector, the user can press the left end of the cover 28. To unlock the SIM card holder, the user can then slide the holder to the left. The user can then carefully pull out and remove the SIM card.

In one example, an electronic module holder 32 is provided comprising a holder 34 configured to hold an electronic module 72, and a door 36 slideably connected to the holder. The electronic module holder may further comprise a resilient element 38 connected to the door and the holder. The door 36 may be attached to a first end of the holder and be slideably connected along a first edge of the first end.

In one example, an assembly 32 is provided comprising an electronic module holder 34 configured to hold an electronic module 72, where the holder 34 is configured to be inserted into a mating receiving area 42 of an apparatus 10; and a door 36 slideably connected to the electronic module holder 34, where the door 36 is configured to close an entrance 44 into the receiving area 42 of the apparatus, where the door 36 is slideable relative to the holder 34 to latch and unlatch the assembly 32 with the apparatus 10.

The holder 34 may comprise a SIM card holding tray which is configured to hold a SIM card as the electronic module. The door 36 may be longitudinally slideably connected to a rear end 50 of the holder 34 between a latched position and an unlatched position. The holder 34 comprises a slot 48 with a portion 46 of the door being slideably located in the slot, where the slot extends in a direction generally orthogonal to an insertion direction between the rear end and a front end of the holder. The door may comprise a snap-lock latch. The assembly may further comprise a spring 38 which biases the door at a first position on the holder. The spring may be configured to be compressed when the door is slid from the first position to a second position on the holder.

An apparatus 10 may be provided comprising the assembly described above and comprising a card reader; the assembly removably connected to the apparatus to removably locate the electronic module at the card reader. The apparatus may further comprise an ejector spring 86, where the ejector spring is compressed by the holder 34 when the holder is inserted into the receiving area, where the ejector spring is configured to at least partially eject the holder from the receiving area when the door is slide to unlatch the door with the apparatus.

An example method may comprise providing a SIM card on a SIM card holding tray of an assembly; and sliding the tray into a mating receiving area of an apparatus, where a door of the assembly is moved into an entrance of the receiving area to close the entrance, and where the door slides relative to the tray to latch the door to the apparatus.

The method may comprise the door sliding in a direction generally orthogonal to a direction of sliding the tray into the mating receiving area. The method may comprise the door being biased by a spring at a latching position on the tray, and where the door is snap-lock latched to the apparatus by resilient deflection of the spring when the door is moved into the entrance. The method may comprise compressing an ejector spring by the tray as the tray is inserted into the receiving area. The method may comprise unlatching the door from the apparatus by longitudinally sliding the door on the tray to an unlatched position. The method may comprise, when the door is moved to the unlatched position, the ejector spring at least partially ejecting the assembly from the receiving area.

Another example method may comprise providing a SIM card holding tray configured to hold a SIM card, where the tray is configured to slide with the SIM card into a receiving area of an apparatus through an entrance; and slideably connecting a door to the tray, where the door is configured to close the entrance and slide relative to the tray between a latched position and an unlatched position at the entrance.

The method may comprise the door being slideably connected to a rear end of the tray, and where the door is slideable on the rear end in a direction generally orthogonal to an axis between the rear end and a front end of the tray. The method may comprise connecting a spring between the door and the tray to bias the door at the latched position on the tray. The method may comprise slideably connecting the door to the tray comprising locating a portion of the door in an elongate slot of the tray. The method may comprise sliding the tray into the receiving area of the apparatus, where the door is moved into the entrance to close the entrance, and where the door longitudinally slides relative to the tray to latch the door to the apparatus.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. An electronic module holder comprising:
   a holder configured to hold an electronic module, a door slideably connected to the holder and integral therewith to form a removable assembly;
   wherein the door is slideably attached directly to a first end of the holder and covering a majority of a first edge of the first end.

2. An electronic module holder according to claim 1 further comprising a resilient element connected to the door and the holder.

3. An electronic module holder comprising:
   a holder configured to hold an electronic module,
   a door slideably connected to the holder and integral therewith to form a removable assembly; wherein
   the electronic module holder is configured to be inserted into a mating receiving area of an apparatus; and
   the door is configured to close an entrance into the receiving area of the apparatus,
   where the door is configured to latch and unlatch the assembly with the apparatus.

4. An assembly as claimed in claim 3 where the assembly is configured to be removable from the receiving area of the apparatus.

5. An assembly as claimed in claim 4 where the holder comprises a slot with a portion of the door being slideably located in the slot, where the slot extends in a direction generally orthogonal to an insertion direction between a rear end and a front end of the holder.

6. An assembly as claimed in claim 3 where the door comprises a snap-lock latch.

7. An assembly as claimed in claim 3 further comprising a spring which biases the door at a first position on the holder.

8. An assembly as claimed in claim 7 where the spring is configured to be compressed when the door is slid from the first position to a second position on the holder.

9. An apparatus comprising:
   a card reader;

the assembly as claimed in claim 3 removably connected to the apparatus to removably locate the electronic module at the card reader.

10. An apparatus as claimed in claim 9 further comprising an ejector spring, where the ejector spring is compressed by the holder when the holder is inserted into the receiving area, where the ejector spring is configured to at least partially eject the holder from the receiving area when the door is slide to unlatch the door with the apparatus.

11. An apparatus as claimed in claim 9 wherein the apparatus comprises a housing including a moveable door, the moveable door having a first closed position and a second open position, wherein the door of the electronic module holder is restricted from sliding when the moveable door is in the closed position.

12. An apparatus as claimed in claim 9 further comprising an ejector spring, where the ejector spring is compressed by the holder when the holder is inserted into the receiving area, where the ejector spring is configured to at least partially eject the holder from the receiving area when the door is slid to unlatch the door with the apparatus.

13. A portable electronic device comprising:
a housing;
a card reader connected to the housing;
the assembly as claimed in claim 3 removeably connected to the apparatus to removeably locate a electronic module at the card reader,
where the housing comprises a slot and the door is slideably located in the slot, where the slot extends in a direction generally orthogonal to an insertion direction between a rear end and a front end of the holder.

14. A method comprising:
providing a SIM card on a SIM card holding tray of an integral assembly; and
sliding the tray into a mating receiving area of an apparatus, where a door of the integral assembly is moved into an entrance of the receiving area and is sized to correspondingly close a majority of the entrance, and where the door slides relative to the tray to latch the door to the apparatus.

15. A method as claimed in claim 14 where the door slides in a direction generally orthogonal to a direction of sliding the tray into the mating receiving area.

16. A method as claimed in claim 14 where the door is biased by a spring at a latching position on the tray, and where the door is snap-lock latched to the apparatus by resilient deflection of the spring when the door is moved into the entrance.

17. A method as claimed in claim 14 further comprising compressing an ejector spring by the tray as the tray is inserted into the receiving area.

18. A method as claimed in claim 17 further comprising unlatching the door from the apparatus by longitudinally sliding the door on the tray to an unlatched position.

19. A method as claimed in claim 18 further comprising, when the door is moved to the unlatched position, the ejector spring at least partially ejecting the assembly from the receiving area.

20. A method comprising:
providing a SIM card holding tray configured to hold a SIM card, where the tray is configured to slide with the SIM card into a receiving area of an apparatus through an entrance; and
slideably connecting a door to the tray, where the door is configured to substantially close the entire entrance and slide relative to the tray between a latched position and an unlatched position at the entrance.

21. A method as claimed in claim 20 where the door is slideably connected to a rear end of the tray, and where the door is slideable on the rear end in a direction generally orthogonal to an axis between the rear end and a front end of the tray.

22. A method as claimed in claim 20 further comprising connecting a spring directly between the door and the tray to bias the door at the latched position on the tray.

23. A method as claimed in claim 20 where slideably connecting the door to the tray comprising locating a portion of the door in an elongate slot of the tray.

24. A method as claimed in claim 20 further comprising sliding the tray into the receiving area of the apparatus, where the door is moved into the entrance to close the entrance, and where the door longitudinally slides relative to the tray to latch the door to the apparatus.

25. An electronic module holder comprising:
a holder configured to hold an electronic module,
a door slideably connected to the holder and integral therewith to form a removable assembly wherein the holder includes at least one appurtenance to slidingly receive the door enabling the door to slide back and forth along an end of the holder.

26. The holder of claim 25, where the appurtenance includes at least one slot formed in the holder to slidingly receive attachment pins affixed to the door.

* * * * *